United States Patent [19]

Kopatz et al.

[11] Patent Number: 4,715,878

[45] Date of Patent: Dec. 29, 1987

[54] PROCESS FOR PRODUCING FINELY DIVIDED SPHERICAL GLASS POWDERS

[75] Inventors: Nelson E. Kopatz; Lori S. Pruyne, both of Sayre, Pa.

[73] Assignee: GTE Products Corporation, Stamford, Conn.

[21] Appl. No.: 24,952

[22] Filed: Mar. 12, 1987

[51] Int. Cl.[4] .................. C03B 19/10; C03C 25/02
[52] U.S. Cl. ..................................... 65/21.1; 65/21.3; 65/60.3; 264/7
[58] Field of Search ............... 65/21.3, 21.1, 24, 60.3; 264/7

[56] References Cited

U.S. PATENT DOCUMENTS

| | | | |
|---|---|---|---|
| 3,533,756 | 10/1970 | Houseman | 65/21.1 X |
| 3,597,177 | 8/1971 | Davidoff | 65/21.3 |
| 3,682,666 | 8/1972 | Lacourrege | 65/21.1 X |
| 4,201,560 | 5/1980 | Dewitte et al. | 65/21.1 |
| 4,643,753 | 2/1987 | Braun | 65/21.3 |

OTHER PUBLICATIONS

A Disintegrator to Make Grains for Glass-Microsphere Prodn., Bychkov et al, UDC 666.11-436, 1980, pp. 558–560, Plenum Pub. Co.

*Primary Examiner*—Robert L. Lindsay
*Attorney, Agent, or Firm*—Donald R. Castle; L. Rita Quatrini

[57] ABSTRACT

A process is disclosed for producing finely divided spherical glass powders. The process comprises forming a coating of a surface active agent which can be of the nonionic or anionic type on the surfaces of the particles of a glass powder, feeding the coated particles and a carrier gas into a high temperature zone and maintaining the particles in the zone for a sufficient time to melt at least about 50% by weight of the particles and to form droplets therefrom, and cooling the droplets to form glass particles having essentially a spherical shape with the majority of the particles having an average particle size of less than about 25 micrometers in diameter which is essentially the same size as the starting glass particles.

7 Claims, No Drawings

PROCESS FOR PRODUCING FINELY DIVIDED SPHERICAL GLASS POWDERS

FIELD OF THE INVENTION

This invention relates to the preparation of glass powders having a small particle size. More particularly it relates to the production of such powders having substantially spherical particles by a high temperature process. Still more particularly, it relates to a process for producing spherical glass particles in which the small particle size of the glass is maintained with the use of a surface active agent.

BACKGROUND OF THE INVENTION

Glass spheres of relatively small particle size have found use in a wide range of applications as in electronics and injection molding of plastics.

U.S. Pat. No. 4,390,368 discloses a free flowing plasma spray powder of substantially spherical particles having a composition consisting essentially of rhenium and tungsten. However, spherical glass particles are more difficult to form because of the higher viscosity of glass at its melting point.

U.S. Pat. No. 3,313,608 describes a method for producing spherical glass beads in which electrical and magnetic fields are used to break up a molten glass stream of about 0.15" in diameter. The beads are of relatively large particle size, with the size range being from about 0.005 to about 0.200 inches in diameter.

One prior art method for forming glass beads of relatively small size is by grinding the glass into small particles followed by injecting the particles into a flame from a burner to melt the particles and allow surface tension to form the particles into spheres.

Commercial glass beads have a particle size in the range of 10 micrometers to 53 micrometers with an average diameter of 30 micrometers. Such beads are described in an article entitled "Shear Band Formation in Polycarbonate-Glass Bead Composites," by M. E. J. Decker and D. Heikens, Journal of Materials Science 19 (1984) 3271-3275.

U.S. Pat. No. 4,076,640, No. 4,191,556, No. 4,376,740, No. 4,490,601, No. 3,829,538, No. 4,252,599, No. 4,474,604, No. 4,435,342, No. 3,742,585, No. 4,332,617, No. 4,386,896, No. 4,264,641, No. 4,215,084, No. 4,069,045, No. 4,259,270, No. 3,907,546, No. 4,028,095, and No. 3,909,241, and Canadian Pat. No. 941,690 relate to metal, alloy, or ore powders or particles or melts and are different from the present invention in that the present invention relates to spherical glass particles.

SUMMARY OF THE INVENTION

A process which yields fine spherical glass powder particles of small particle size from irregular shaped particles in relatively high yields would be an advancement in the art.

In accordance with one aspect of this invention, there is provided a process comprising (a) forming a coating of a surface active agent which can be of the nonionic or anionic type, on the surfaces of the particles of a glass powder, (b) feeding the particles into a high temperature zone having a temperature sufficiently high to form molten droplets of at least about 50% by weight of the glass powder particles, and (c) cooling the molten droplets to form glass particles having essentially a spherical shape with the majority of the essentially spherical particles having a particle size of less than about 25 micrometers in diameter which is essentially the same size as the starting glass particles.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

It has been found that glass powders, especially small particle size glass powders, fed to a high temperature reactor such as a plasma tend to agglomerate and cause the average particle size of the plasma melted material to be larger than the average particle size prior to melting. The process of this invention prevents this agglomeration.

The glass powders can be essentially any non-metallic glasses which forms an amorphous phase on rapid cooling. The especially preferred glasses of this invention are pyrex, quartz, soda lime, lead silicate, borates, and borosilicates.

It is preferred to have a homogeneous heat of glass which has a predetermined softening point.

The heat of glass is crushed by standard methods to produce irregularly shaped particles and classified if necessary by standard methods to provide the desired particle size which is determined by the application in which the finished spherical particles are to be used. The particle size of the starting particles is reduced to less than about 25 micrometers in diameter, and typically less than about 10 micrometers in diameter. Sometimes less than about 3 micrometers in diameter is preferred for some applications. The particle size as used in this invention is the average diameter. The preferred method of measurement of particle size is by sedigraph.

The particles of the glass powder are coated with a surface active agent (surfactant) which can be of either the nonionic or the anionic type.

Suitable nonionic surfactants that can be used are the polyoxyethylene, ethoxylated akylphenols, ethoxylated aliphatic alcohols, carboxylic esters, carboxylic amides, polyoxyethylene fatty acid amides, and polyalkyline oxide block copolymers. One preferred nonionic surfactant is sold by Rohm and Haas Company under the trade name of "Triton X-100."

Suitable anionic surfactants that can be used are carboxylates, polyalkoxycarboxylates, N-acylsarcosinates, sulfonates, alkylbenzenesulfonates, alkylarenesulfonates (short chain), lignosulfonates, naphthalenesulfonates, alpha olefinsulfonates, petroleum sulfonates, sulfonates with ester, amide, or ether linkages, amidosulfonates, sulfates and sulfated products, alcohol sulfates, alcohols (ethoxylated and sulfated), alkylphenols (ethoxylated and sulfated), and sulfated acids, amides, and esters. Preferred of these is a sodium N-acyl-N-alkyltaurate supplied by GAF Corporation under the trade name of Igepon T-77.

Suitable nonionic and anionic surfactants are listed in Vol. 22, Kirk Othmer, Encyclopedia of Chemical Technology, 3rd. Edition.

It is believed that these surfactants act to neutralize or shield against electrostatic charges that may act to agglomerate the glass powder particles together.

It is preferred to form the coating by forming an aqueous solution of the surfactant and wetting the particles with the solution. An aqueous solution having a concentration of the surfactant of from about 0.1% by weight to about 1% by weight is suitable for coating an equal weight amount of glass powder. The glass particles that are coated can then be dried and screened through a 170 mesh screen.

The resulting surfactant coated powders are then entrained in a carrier gas which is a non-reducing gas with argon being the preferred gas. Other non-reducing gases which can be used are helium, nitrogen, oxygen, and air.

The entrained particles are then fed into a high temperature zone having a temperature sufficiently above the softening point of the glass to allow surface tension to subsequently spheroidize the particles and having a temperature below the vaporization temperature of the glass. The particles are maintained in the high temperature zone for a sufficient time to melt at least about 50% by weight of the particles and form droplets therefrom. In actuality, at least about 90% by weight of the starting glass particles are melted.

In accordance with a preferred embodiment, the preferred high temperature zone is a plasma.

The droplets are then cooled to form solid spheres having essentially the same average particle size as the starting irregularly shaped particles and a substantially reduced surface area as compared with the irregularly shaped particles. It is preferred that the droplets be cooled relatively rapidly to prevent phase separation in the droplets. The rapid cooling is accomplished in the plasma operation by the particles being cooled in flight before they hit a surface.

Details of the principles and operation of plasma reactors are well known. The plasma has a high temperature zone, but in cross section, the temperature can vary from about 5500° C. to about 17,000° C. The outer edges are at low temperatures and the inner part is at a higher temperature. The residence time depends upon where the particles entrained in the carrier gas are injected into the nozzle of the plasma gun. Thus, if the particles are injected into the outer edge, the residence time must be longer and if they are injected into the inner portion, the residence time is shorter. Thus residence time in the plasma flame can be controlled by choosing the point at which the particles are injected into the plasma. Residence time in the plasma is a function of the thermophysical properties of the plasma gas and the powder material itself for a given set of plasma operating conditions and powder particles. Residence times are generally from about 50 milliseconds to about 100 milliseconds depending on the particle size.

The plasma gas is a non-reducing gas with argon being the preferred gas. Other suitable non-reducing gases are helium and nitrogen.

The plasma process is advantageous for producing fine spherical glass particles because the extremely high temperatures afforded by the plasma are necessary to achieve the low viscosity which is critical to form spheres in glasses. Use of a surfactant allows the particle size of the starting glass particles to be maintained throughout the high temperature processing by preventing agglomeration of particles.

The spherical particles thus produced can be further classified to produce the desired size range and distribution.

Controlled initial crushing and milling parameters of the starting glass, controlled high temperature heating parameters, and the subsequent classification of the spherical particles results in a high yield of very clean spherical glass particles having the desired particle size range and distribution.

Details on the specific conditions for producing a particular particle size for a glass will be apparent in the example that follows.

Particles having an average diameter of less than about 25 micrometers can find use in glass filled polymers for hardening and wear resistance.

Particles having an average diameter of less than about 10 micrometers can find use in glass filled polymers primarily as a strengthening dispersoid.

Particles having an average diameter of less than about 5 micrometers can find use in thick film pastes which allow dispersion of the conductive metallic particle and bonding to non-metallic substrates. Spherical glass particles can aid in the fluidity of the paste and the ease with which the binders carriers can be removed.

To more fully illustrate this invention, the following non-limiting example is presented.

Example

About 100 parts of deionized water are mixed with about 1 part of a nonionic surfactant sold under the trade name of Triton X-100 by Rohm and Haas Company. The resulting aqueous solution is blended with about 100 parts of finely divided glass having an average particle size of about 28 micrometers in diameter. After blending for a sufficient time to wet essentially all of the particles, the wetted particles are air-dried and then screened through a 170 mesh screen. An argon plasma flame is generated with a gas flow of about 30 l/min. with about 15 kilowatts of input power of about 500 amps and about 30 volts. The power can be typically from about 10 to about 80 kilowatts. The surfactant coated particles are introduced into the plasma flame at a rate of about 25 g/min. being fed by a carrier gas at a flow rate of about 3 l/min. The flow rate of the carrier gas can be typically from about 1 to about 10 l/min. The powder is melted in flight in the plasma and collected in a chamber which has an atmosphere of air. The average particle size of the powder is given in the Table along with a plasma processed glass powder without a surfactant.

From the Table, it can be seen that the average particle size of the surfactant coated particles is essentially unchanged by plasma processing. This is seen in both the average particle size values and in the weight percent which is less than about 3 micrometers in diameter. When a surfactant is not used, the average particle size increases, and the weight percent less than about 3 micrometers decreases. This indicates that the small particle size is not maintained as it is in the surfactant treated material.

TABLE

| Glass Sample No. | Description | Average Diameter Micrometers | Weight percent <3 micrometers |
| --- | --- | --- | --- |
| 1 | Starting material First batch | 2.8 | 63.0 |
| 2 | Plasma processed No surfactant | 3.8 | 41.0 |
| 3 | Plasma processed with Triton X-100 | 2.8 | 64.0 |

While there has been shown and described what are at present considered the preferred embodiments of the invention, it will be obvious to those skilled in the art that various changes and modifications may be made therein without departing from the scope of the invention as defined by the appended claims.

What is claimed is:

1. A process comprising:
   (a) forming a coating of a surface active agent selected from the group consisting of nonionic surface active agents and anionic surface active agents on the surfaces of the particles of a glass powder, the average particle size of said particles being less than about 25 micrometers in diameter;
   (b) feeding the resulting coated particles and a carrier gas into a high temperature zone and maintaining said particles in said zone for a sufficient time to melt at least about 50% by weight of said particles, and to form droplets therefrom; and
   (c) cooling said droplets to form glass particles having essentially a spherical shape with the majority of said glass particles having a size which is essentially the same as the size of the starting glass powder particles.

2. A process according to claim 1 wherein said glass is a non-metallic glass which forms an amorphous phase on rapid cooling.

3. A process according to claim 2 wherein said glass is selected from the group consisting of pyrex, quartz, soda lime, lead silicate, borates, and borosilicates.

4. A process according to claim 1 wherein said high temperature zone is created by a plasma torch.

5. A process according to claim 1 wherein at least about 90% by weight of the starting glass particles are melted.

6. A process according to claim 1 wherein said particle size is less than about 10 micrometers in diameter.

7. A process according to claim 6 wherein said particle size is less than about 3 micrometers in diameter.

* * * * *